(12) United States Patent
Tang et al.

(10) Patent No.: US 12,236,279 B2
(45) Date of Patent: Feb. 25, 2025

(54) RESOURCE SCHEDULING METHOD, APPARATUS AND SYSTEM

(71) Applicant: ZTE Corporation, Shenzhen (CN)

(72) Inventors: Bo Tang, Shenzhen (CN); Kewen Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 340 days.

(21) Appl. No.: 17/637,840

(22) PCT Filed: Nov. 12, 2020

(86) PCT No.: PCT/CN2020/128420
§ 371 (c)(1),
(2) Date: Feb. 24, 2022

(87) PCT Pub. No.: WO2021/104033
PCT Pub. Date: Jun. 3, 2021

(65) Prior Publication Data
US 2022/0283869 A1  Sep. 8, 2022

(30) Foreign Application Priority Data
Nov. 28, 2019  (CN) .......................... 201911192927.9

(51) Int. Cl.
*G06F 9/50* (2006.01)
*G06F 9/455* (2018.01)
*G06F 9/48* (2006.01)

(52) U.S. Cl.
CPC ........ *G06F 9/5055* (2013.01); *G06F 9/45558* (2013.01); *G06F 9/4881* (2013.01);
(Continued)

(58) Field of Classification Search
CPC .. G06F 9/5055; G06F 9/45558; G06F 9/4881; G06F 9/5072; G06F 2009/4557;
(Continued)

(56) References Cited

U.S. PATENT DOCUMENTS 10,191,778 B1    1/2019  Yang
2014/0351443 A1*  11/2014  Tang ..................... G06F 9/5077
709/226
(Continued)

FOREIGN PATENT DOCUMENTS

CN    105677479 A    6/2016
CN    109376009 A    2/2019
(Continued)

OTHER PUBLICATIONS

International Search Report for corresponding application PCT/CN2020/128420 filed Nov. 12, 2020; Mail date Feb. 18, 2021.
(Continued)

*Primary Examiner* — Kenneth Tang
(74) *Attorney, Agent, or Firm* — CANTOR COLBURN LLP

(57) ABSTRACT

The embodiments of the present disclosure disclose a resource scheduling method, apparatus and system. The method comprises: receiving, by a management node, a Pod creation request from a user, wherein the Pod creation request comprises: requirements of each container for each type of shareable resources; selecting, by the management node, a node for a Pod object to be created, and allocating each type of shareable resources of each container to the Pod object according to shareable resource information of a shareable device in the selected node; and binding the Pod object, the selected node and allocated resources, and storing the Pod object bound to the selected node and the allocated resources.

19 Claims, 4 Drawing Sheets

(52) U.S. Cl.
CPC .... *G06F 9/5072* (2013.01); *G06F 2009/4557* (2013.01); *G06F 2009/45595* (2013.01); *G06F 2209/5011* (2013.01)

(58) Field of Classification Search
CPC ... G06F 2009/45595; G06F 2209/5011; H04L 67/60; H04L 67/10
See application file for complete search history.

(56) References Cited

U.S. PATENT DOCUMENTS

| | | | |
|---|---|---|---|
| 2017/0257424 A1* | 9/2017 | Neogi | H04L 47/781 |
| 2018/0167487 A1* | 6/2018 | Vyas | G06F 9/5027 |
| 2018/0359338 A1* | 12/2018 | Vyas | H04L 67/34 |
| 2019/0007410 A1* | 1/2019 | Hu | H04L 63/0281 |
| 2019/0034237 A1* | 1/2019 | Siddappa | H04L 67/1012 |
| 2019/0220625 A1 | 7/2019 | Durham | |
| 2019/0356693 A1 | 11/2019 | Cahana | |
| 2020/0192702 A1* | 6/2020 | Nassi | G06F 9/5011 |
| 2020/0241993 A1* | 7/2020 | Chen | G06F 11/3409 |
| 2020/0250006 A1* | 8/2020 | Parekh | H04L 67/1008 |
| 2021/0034423 A1* | 2/2021 | Hallur | G06F 9/45558 |
| 2021/0072966 A1* | 3/2021 | Zong | H04L 67/60 |
| 2021/0141655 A1* | 5/2021 | Gamage | G06F 9/45545 |
| 2021/0149737 A1* | 5/2021 | An | G06F 11/3024 |
| 2021/0149745 A1* | 5/2021 | An | G06F 9/5083 |
| 2021/0373958 A1* | 12/2021 | Nakfour | G06F 9/5027 |
| 2022/0253335 A1* | 8/2022 | Bequet | G06N 3/084 |
| 2022/0283846 A1* | 9/2022 | Zhang | G06F 9/4881 |

FOREIGN PATENT DOCUMENTS

| | | |
|---|---|---|
| CN | 109936604 A | 6/2019 |
| CN | 110471766 A | 11/2019 |

OTHER PUBLICATIONS

European Search Report for corresponding application EP20891970: Report dated Jul. 26, 2022.

* cited by examiner

RESOURCE SCHEDULING METHOD, APPARATUS AND SYSTEM

CROSS REFERENCE

This application is a National Stage Filing of the PCT International Application No. PCT/CN2020/128420 filed on Nov. 12, 2020, which claims priority to Chinese Application No. 201911192927.9 filed on Nov. 28, 2019, the entirety of which is herein incorporated by reference.

TECHNICAL FIELD

The embodiments of the present disclosure relate to, but are not limited to, the field of computer application technology, and in particular, relate to a resource scheduling method, apparatus and system.

BACKGROUND

Container technologies represented by Docker have been paid more and more attention, and become an important choice of Cloud-Native applications. Moreover, a mainstream cloud platform Kubernetes provides powerful Platform as a Service (PaaS) capabilities, such as orchestration and scheduling, scaling, and High Available (HA) guarantee of applications, and has become de facto standards of container scheduling platforms.

Kubernetes supports management and scheduling of universal resources such as CPU, memory and storage while providing a good extension mechanism for extending management and scheduling of external devices or external resources (such as a graphics processing unit (GPU), a field programmable gate array (FPGA), and a tensor processing unit (TPU)). By developing specific device plugins by users or device manufacturers, scheduling of these devices on Kubernetes can be well supported. However, when performing resource scheduling, related mechanisms of Kubernetes can only perform scheduling by taking a device as a unit. Nevertheless, along with the increase of degree of integration, a single device can usually provide powerful processing capabilities. For example, regarding the use of a GPU, in certain scenarios (for example, artificial intelligence (AI) model inference), not all processing capabilities of a device are needed. Thus, in such scenarios, when an exclusive device is allocated to a single application, if the application cannot use all processing capabilities of the device, a huge waste of resources is caused.

SUMMARY

The embodiments of the present disclosure provide a resource scheduling method, apparatus and system, which can save resources and increase the resource utilization.

The embodiments of the present disclosure provide a resource scheduling method, including the followings.

A slave node acquires shareable information of each shareable device, wherein the shareable information includes: an identifier (ID) of the shareable device, a maximum shareable number of the shareable device, and a device state and resource property information of the shareable device; and the device state includes: whether the shareable device is healthy and whether the shareable device is available.

The slave node converts the shareable information into shareable resource information, and reports the shareable resource information to a management node, wherein the shareable resource information of the device includes: the ID of the shareable device, the resource property information of the shareable device and the maximum shareable number of the shareable device.

The embodiments of the present disclosure provide a resource scheduling method, including the followings.

A management node receives a Pod creation request from a user, wherein the Pod creation request includes: requirements of each container for each type of shareable resources.

The management node selects a node for a Pod object to be created, and allocates each type of shareable resources of each container to the Pod object according to shareable resource information of a shareable device in the selected node.

The embodiments of the present disclosure provide a resource scheduling apparatus, including a processor and a computer-readable storage medium, wherein the computer-readable storage medium has instructions stored therein, and when the instructions are executed by the processor, any one of the described resource scheduling methods is implemented.

The embodiments of the present disclosure provide a computer-readable storage medium which has computer programs stored therein, wherein when the computer programs are executed by a processor, operations of any one of the described resource scheduling methods are implemented.

The embodiments of the present disclosure provide a resource scheduling apparatus, including a shareable information acquisition module and a shareable resource information reporting module.

The shareable information acquisition module is configured to acquire shareable information of each shareable device, wherein the shareable information includes: an ID of the shareable device, a maximum shareable number of the shareable device, and a device state and resource property information of the shareable device; and the device state includes: whether the shareable device is healthy and whether the shareable device is available.

The shareable resource information reporting module is configured to convert the shareable information into shareable resource information, and report the shareable resource information to a management node, wherein the shareable resource information includes: the ID of the shareable device, the resource property information of the shareable device and the maximum shareable number of the shareable device.

The embodiments of the present disclosure provide a resource scheduling apparatus, including a Pod request receiving module and a Pod object binding module.

The Pod request receiving module is configured to receive a Pod creation request from a user, wherein the Pod creation request includes: requirements of each container for each type of shareable resources.

The Pod object binding module is configured to select a node for a Pod object to be created, and allocate each type of shareable resources of each container to the Pod object according to shareable resource information of a shareable device in the selected node.

The embodiments of the present disclosure provide a resource scheduling system, including a slave node and a management node.

The slave node is configured to acquire shareable information of each shareable device, wherein the shareable information includes: an ID of the shareable device, a maximum shareable number of the shareable device, and a device state and resource property information of the shareable device; and the device state includes: whether the shareable device is healthy and whether the shareable device is available; and configured to convert the shareable information into shareable resource information, and report the shareable resource information to a management node, wherein the shareable resource information includes: the ID of the shareable device, the resource property information of the shareable device and the maximum shareable number of the shareable device.

The management node is configured to receive the shareable resource information of the shareable device reported by the slave node, and store or update the shareable resource information of the shareable device, wherein the shareable resource information includes: the ID of the shareable device, the resource property information of the shareable device and the maximum shareable number of the shareable device; configured to receive a Pod creation request from a user, wherein the Pod creation request includes: requirements of each container for each resource; and configured to select a node for a Pod object to be created, and allocate each type of shareable resources of each container to the Pod object according to the shareable resource information of the shareable device in the selected node.

In the embodiments of the present disclosure, a management node receives a Pod creation request from a user, wherein the Pod creation request includes: requirements of each container for each type of shareable resources; and the management node selects a node for a Pod object to be created, and allocates each type of shareable resources of each container to the Pod object according to shareable resource information of a shareable device in the selected node. The embodiments of the present disclosure introduce a management and scheduling mechanism for shared resources, thereby saving resources and increasing the resource utilization.

Additional features and advantages of the embodiments of the present disclosure will be set forth in the following description, and in part will be obvious from the description, or may be learned by implementing the embodiments of the present disclosure. The objectives and other advantages of the embodiments of the present disclosure can be achieved and obtained by the structures particularly pointed out in the description, claims and drawings.

BRIEF DESCRIPTION OF THE DRAWINGS

The drawings are used for providing further understanding of the technical solutions of embodiments of the present disclosure and constitute a part of the description, and are used for explaining the technical solutions of embodiments of the present disclosure together with the embodiments of the present disclosure, rather than constitute limitation on the technical solutions of embodiments of the present disclosure.

DETAILED DESCRIPTION

Hereinafter, the embodiments of the present disclosure will be described in detail with reference to the accompanying drawings. It is to be noted that embodiments and the features in the embodiments of the present disclosure can be combined with each other without conflicts.

Operations shown in the flowcharts of the accompanying drawings can be executed in a computer system such as a set of computer-executable instructions. Moreover, although the logic sequences are shown in the flowcharts, in some cases, the shown or described operations can be executed in sequences different from those described herein.

Figure 1:
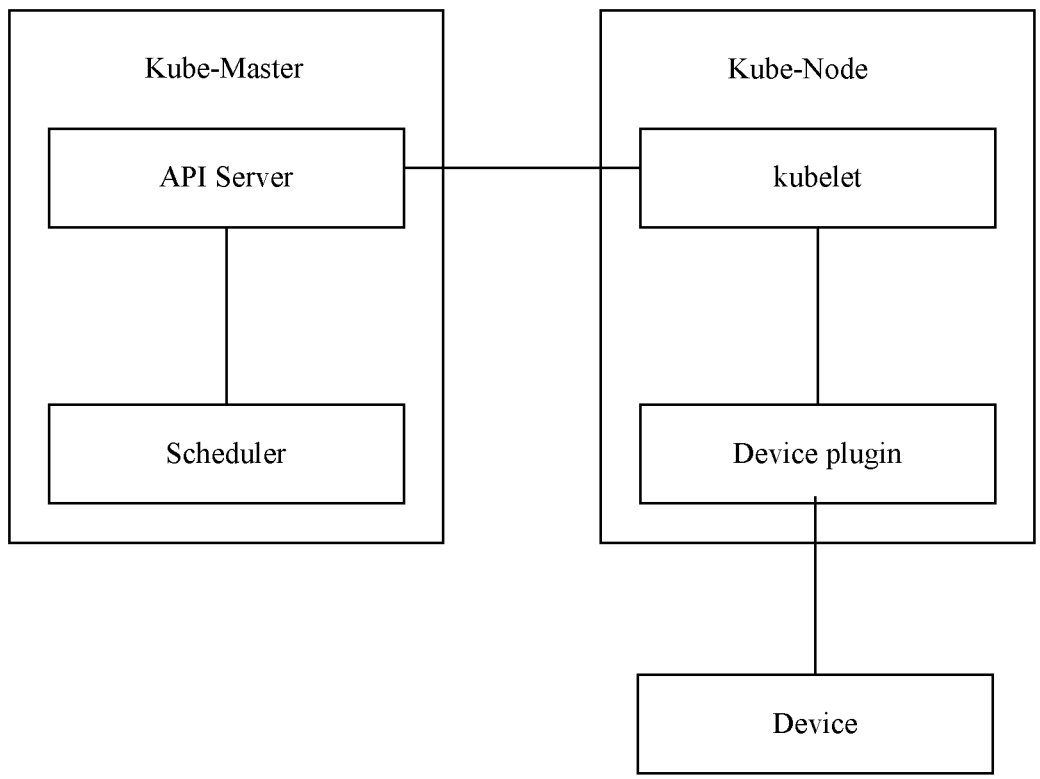
FIG. 1 is an architecture diagram of a system for managing and scheduling resources on the basis of Kubernetes in the related art.

FIG. 1 is an architecture diagram of a current system for managing and scheduling resources on the basis of Kubernetes. As shown in FIG. 1, the system includes: a management node (referred to as Kube-Master) and at least one slave node (referred to as Kube-Node).

The management node includes an application server (e.g., an Application Programming Interface (API) Server) and a scheduling program (referred to as Scheduler). Each slave node includes a node agent (referred to as kubelet) and a Device plugin. It should be noted that the API Sever and the Scheduler may be provided as independent node(s) (i.e., management node(s)), and may also be provided on the same node as the kubelet and the Device plugin. When a slave node provided with the kubelet and the Device plugin are simultaneously provided with the API Server and the Scheduler, the slave node becomes a management node.

The following embodiments are described from the perspective of a management node and a slave node. However, the management node and the slave node may be the same node or may be different nodes.

The Device plugin is configured to acquire device information and report the device information to the kubelet, wherein the device information includes: an ID of the device and a device state, and the device state includes: whether the device is healthy, whether the device is available, etc.

The kubelet is configured to convert the device information into the number of available resources corresponding to each device, and report the number of available resources corresponding to each device to the API Server; and periodically acquire, from the API Server, a Pod object which is bound to the present node but is not started, invoke an Allocate interface of the Device Plugin according to allocated resource information in the Pod object so as to trigger loading of the device and acquire configuration information, and create a Pod according to the configuration information and the allocated resource information.

The API Server is configured to store the number of available resources corresponding to each device and receive a Pod creation request from a user. The Pod creation request includes: image information of a container, the number of each type of resources requested (including CPU, memory, GPU, etc.) and basic information of the Pod, etc. The API Server is also configured to store the Pod object bound to the node and the available resources.

The Scheduler is configured to periodically acquire, from the API Server, a Pod object to be created; select, for the Pod object, a node of which the number of each type of available resources is greater than or equal to the number of resources requested; allocate resources for the Pod object from the available resources; bind the Pod object, the selected node and the allocated resources, i.e. storing information of the selected node and information of the allocated resources in the Pod object; and return the Pod object bound to the node and the allocated resources to the API Server.

In the following embodiments, description is made by taking the Device Plugin as a first module, the kubelet as a second module, the API Server as a third module, and the Scheduler as a fourth module.

Figure 2:
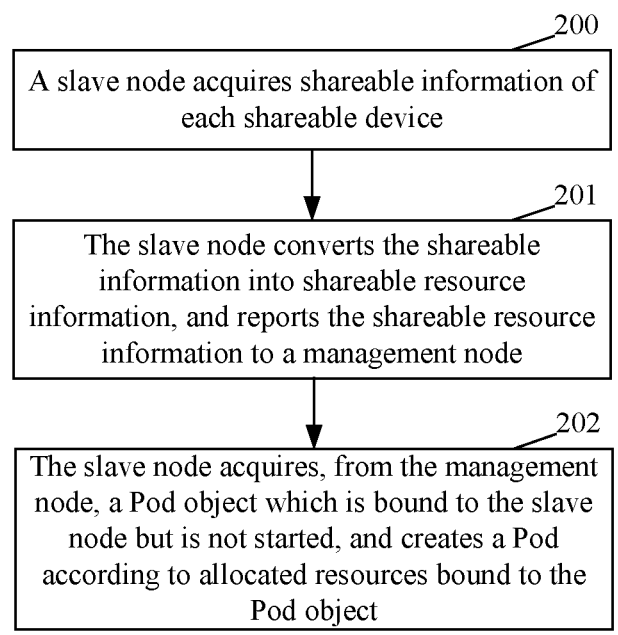
FIG. 2 is a flowchart of a resource scheduling method provided in some embodiments of the present disclosure.

Referring to FIG. 2, some embodiments of the present disclosure provide a resource scheduling method, applied to a slave node, the method including operations 200 to 201.

In operation 200, a slave node acquires shareable information of each shareable device.

In some exemplary implementations, the first module acquires the shareable information of each shareable device, and reports the shareable information of the shareable device to the second module.

In the embodiments of the present disclosure, the shareable information includes: an ID of the shareable device, a maximum shareable number of the shareable device, and a device state and resource property information of the shareable device.

In some exemplary embodiments, the maximum shareable number refers to the number of all sub-resources obtained by segmenting the shareable device as a shareable resource, and the specific number of the sub-resources which are segmented may be preset.

In some exemplary embodiments, the device state includes: whether the shareable device is healthy, whether the shareable device is available, etc.

In the embodiments of the present disclosure, the shareable device refers to a device capable of supporting concurrent use of multiple containers in the device, such as a GPU and an FPGA.

In the embodiments of the present disclosure, when the first module reports the shareable information to the second module, if there are multiple shareable devices, the shareable information corresponding to all the shareable devices may be reported to the second module at one time in the form of a list, or the shareable information corresponding to one shareable device may be reported at one time, or the shareable information corresponding to multiple shareable devices may be reported at one time.

In some exemplary implementations, when reporting the shareable information corresponding to each shareable device, the shareable information may be reported in multiple modes. For example, the shareable information may be reported by using modes such as an object and a data structure.

For example, when reporting in a json object mode, the reported json object is:

```
Shareable Device {
    "ID": "1",   # the ID of the device
    "max_share_num": 4,   # the maximum shareable number
    "properties": {"memory": "16GB"},   # resource properties
    "health": "Healthy"   # device state
}
```

Herein, SharedDevice is an object name of the device, ID is the ID of the device, max_share_num is the maximum shareable number, properties are resource properties (such as a GPU display memory, and the number of processing units of the device), and health is the device state.

The max_share_num and properties are newly-added fields.

In the embodiments of the present disclosure, the first module reports the shareable information of the device to the second module via a ListAndWatch interface.

In operation 201, the slave node converts the shareable information into shareable resource information, and reports the shareable resource information to a management node.

In some exemplary implementations, the second module converts the shareable information into shareable resource information, and reports the shareable resource information to the third module of the management node, and the third module stores or updates the shareable resource information.

In the embodiments of the present disclosure, the shareable resource information includes: the ID of the shareable device, the resource property information of the shareable device and the maximum shareable number of the shareable device.

In the embodiments of the present disclosure, when the second module reports the shareable resource information of the shareable device to the third module, if there is shareable resource information of multiple shareable devices, the shareable resource information of the shareable devices may be reported to the third module at one time in the form of a list, or the shareable resource information of one shareable device may be reported at one time, or the shareable resource information of multiple shareable devices may be reported at one time.

In some exemplary implementations, when reporting the shareable resource information of each shareable device, the shareable information may be reported in multiple modes. For example, the shareable information may be reported by using modes such as an object and a data structure.

For example, when reporting by using an object mode, the reported object is:

```
type Resource struct {
    MilliCPU          int64
    Memory            int64
    EphemeralStorage  int64
    ......
    // ScalarResources
    ScalarResources map[v1.ResourceName]int64
    //Newly-added ShareableResources field
    SharableResouces map[v1.ResourceName][ ]SharableResouce
}
``` wherein MilliCPU is the number of CPU millicores, Memory is the memory size, EphemeralStorage is an ephemeral storage size, ScalarResources is the number of available resources, and SharableResouces is a list of shareable resource information of a shareable device.

The shareable resource information of a shareable device includes: an ID of the shareable device, a maximum shareable number of the shareable device and resource property information of the shareable device.

```
type SharableResouce struct{
    Id string
    Value int64  //the number of allocatable shareable resources
    Properties map[string][ ]int
}
``` wherein Id is the ID of the shareable device, Value is the maximum shareable number of shareable devices, and Properties are resource property information.

In some other embodiments of the present disclosure, the method further includes the following operation 202.

In operation 202, the slave node acquires, from the management node, a Pod object which is bound to the slave node but is not started, and creates a Pod according to allocated resources bound to the Pod object. In some exemplary implementations, according to the allocated resources bound to the Pod object, loading of the device is triggered and configuration information is acquired, and the Pod is created according to the configuration information and information of the allocated resources. Creating a Pod means creating all containers in the Pod. The allocated resources include shareable resources, or shareable resources and non-shareable resources.

In some exemplary implementations, the second module acquires, from the third module, the Pod object which is bound to the slave node but is not started; invokes, according to the allocated resources bound to the Pod object, the first module to trigger loading of the device and acquire configuration information; and creates containers according to the configuration information and information of the allocated resources.

In some exemplary implementations, the operation that the second module invokes, according to the allocated resources bound to the Pod object, the first module to trigger loading of the device and acquire configuration information includes the followings.

The second module sends a request message of an Allocate interface to the first module, wherein the request message includes allocated shareable resources, and the allocated shareable resources include: the ID of the shareable device and the number of allocated shareable resources; and the first module returns configuration information of the shareable device corresponding to the ID of the device to the second module.

The request message of the Allocate interface is as follows:

```
AllocateRequest [
{
    "deviceID": 0,
    "value": 2
}
```

Herein, deviceID is the ID of the shareable device, value is the number of allocated shareable resources, and the unit of the allocated shareable resources is slice. When the number of allocated shareable resources is the same as the maximum shareable number max_share_num of shareable devices of the device, the device is in an exclusive mode; and when the number of allocated shareable resources is less than the maximum shareable number max_share_num of the shareable devices, the device is in a sharing mode.

Figure 3:
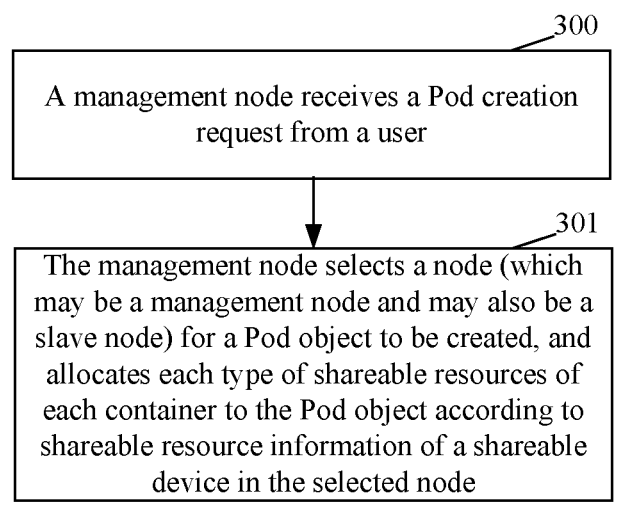
FIG. 3 is a flowchart of a resource scheduling method provided in some other embodiments of the present disclosure.

Referring to FIG. 3, some other embodiments of the present disclosure provide a resource scheduling method, applied to a management node, the method including operation 300 and 301.

In operation 300, a management node receives a Pod creation request from a user.

In some exemplary implementations, the third module receives the Pod creation request from the user, and creates a Pod object according to the Pod creation request.

In the embodiments of the present disclosure, the Pod creation request includes: requirements of each container for each type of shareable resources, wherein the requirements for each type of shareable resources include: the number of shareable resources; or the number of shareable resources and resource property requirements corresponding to the shareable resources.

The resource property requirements include: a resource property value requested or an expression that the resource property value satisfies. For example, a certain resource property value is 10, and a resource property value requested is 6. For another example, the resource property value is required to be greater than 10.

In some exemplary embodiments, the Pod creation request further includes: image information of containers, and basic information of the Pod, etc.

In the embodiments of the present disclosure, the number of each type of shareable resources requested in the Pod creation request should be an integer. When a unit, e.g., slice, is not specified for the number of each type of shareable resources requested, the unit of the shareable resource requested is device by default and the device is processed according to an exclusive mode, and in this case, the unit of the number of each type of shareable resources requested needs to be converted into slice. When a unit, e.g., slice, is specified for the number of each type of shareable resources requested, the device is processed according to a sharing mode, and in this case, the number of each type of shareable resources requested can only be less than or equal to the maximum shareable number of one shareable device. That is to say, a device being used in both an exclusive mode and a sharing mode is not supported, for example, if a user requests for four slices, two slices cannot be allocated on each of two devices.

The exclusive mode means that one device is exclusively used by one container, and the performance will not be impaired due to the introduction of the sharing mode into a system. The sharing mode means that one device is used concurrently by multiple containers.

For example, if applying for 2 slices of shared resources and a certain property value is required to be greater than 10, the Pod creation request includes the following information:

```
apiVersion: V1    # API version
kind: Pod  # resource type
metadata:    # metamessage
    name: share-demo # Pod name
spec:   # detailed description of pod
container:    # description of container
    - name: shared-container-1 # container name
      image: ai.kubernetes.io/inference:2.0 # image information used by a container
```

```
    resources:      # description of resources
        limits:     # resource limits
            cpu: "1"     # the number of CPUs used by a container is limited to be 1
            memory: "500Mi"     # the size of memory used by a container is limited to be
500Mb
            # a yaml description mode of shared resources which is newly added in the
embodiments of the present disclosure
        alpha.kubernetes.io/share-resource1:     # shared resource name
            value: 2slice    #   applying for 2 slices of shareable resources
            <property_name>: 10    # applying for a certain property value no less than 10
```

For another example, if only applying for 2 slices of shared resources, the Pod creation request includes the following information:

```
    ... # the previous information remains unchanged
    resources:
        limits:    # resource limits
            cpu: "1"     # the number of CPUs used by a container is limited to be 1
        memory: "500Mi"    # the size of memory is limited to be 500Mb
        alpha.kubernetes.io/share-resource1: 2slice # applying for 2 slices of shareable resources
        For another example, if applying for exclusively using two devices, the Pod creation request
includes the following information:
    ... # the previous information remains unchanged
        resources:
            limits:    # resource limits
                cpu: "1"     # the number of CPUs used by a container is limited to be 1
                memory: "500Mi"    # the size of memory is limited to be 500Mb
            alpha.kubernetes.io/share-resource1: 2 # applying for exclusively using two devices capable
of sharing resources
```

In operation 301, the management node selects a node (which may be a management node and may also be a slave node) for a Pod object to be created, and allocates each type of shareable resources of each container to the Pod object according to shareable resource information of a shareable device in the selected node.

In some exemplary implementations, the fourth module periodically acquires, from the third module, the Pod object to be created; selects, for the Pod object to be created, a node that has a device that satisfies the requirements of the requested shareable resources for each type of shareable resources requested; and allocates each type of shareable resources requested to the Pod object according to shareable resource information of a shareable device in the selected node.

In the embodiments of the present disclosure, the selected node needs to be capable of allocating the requested shareable resources to all the containers requiring to be created, for example, the selected node at least needs to satisfy: for the requirements of each container in the Pod creation request for each type of shareable resources, there is a shareable device satisfying the requirements of shareable resources in the selected node. Certainly, after the described condition is satisfied, requirements of different containers for different shareable resources also need to be ensured, and a shareable device satisfying the requirements of shareable resources does not conflict when the shareable resources are allocated.

In some exemplary embodiments, the shareable device satisfying the requirements of shareable resources includes a shareable device.

The shareable device satisfies conditions that the shareable device includes allocated shareable resources and the number of shareable resources requested is less than or equal to a difference between the maximum shareable number of the shareable device and the number of the allocated shareable resources.

Alternatively, the shareable device satisfies conditions that the shareable device includes allocated shareable resources, the number of shareable resources requested is less than or equal to a difference between the maximum shareable number of the shareable device and the number of the allocated shareable resources, and an amount of resource properties requested is less than or equal to a product of a ratio of the number of shareable resources requested to the maximum shareable number of the shareable device multiplied by the resource property value.

Alternatively, the shareable device satisfies conditions that the shareable device includes allocated shareable resources, the number of shareable resources requested is less than or equal to a difference between the maximum shareable number of the shareable device and the number of the allocated resources, and an amount of resource properties satisfies an expression in resource property requirements.

Alternatively, the shareable device satisfies conditions that the shareable device does not include allocated shareable resources and the number of shareable resources requested is less than or equal to the maximum shareable number of the shareable device.

Alternatively, the shareable device satisfies conditions that the shareable device does not include allocated shareable resources, the number of shareable resources requested is less than or equal to the maximum shareable number of the shareable device, and an amount of shareable resource properties requested is less than or equal to a product of the ratio of the number of shareable resources requested to the maximum shareable number of the shareable device multiplied by the resource property value.

Alternatively, the shareable device satisfies conditions that the shareable device does not include allocated shareable resources, the number of shareable resources requested is less than or equal to the maximum shareable number of the shareable device, and an amount of resource properties satisfies an expression in resource property requirements.

In the embodiments of the present disclosure, allocating each type of shareable resources of each container to the Pod object according to shareable resource information of a shareable device in the selected node includes any one or more of the following:

for each type of shareable resources of each container, in a case where the selected node has a shareable device including allocated shareable resources, resources in a first device are allocated to the Pod object; and for each type of shareable resources of each container, in a case where none of shareable devices in the selected node includes allocated shareable resources, resources in a second device are allocated to the Pod object.

The first device includes a shareable device.

The shareable device satisfies conditions that the shareable device includes allocated shareable resources and the number of shareable resources requested is less than or equal to a difference between the maximum shareable number of the shareable device and the number of the allocated shareable resources.

Alternatively, the shareable device satisfies conditions that the shareable device includes allocated shareable resources, the number of shareable resources requested is less than or equal to a difference between the maximum shareable number of the shareable device and the number of the allocated shareable resources, and an amount of resource properties requested is less than or equal to a product of the ratio of the number of shareable resources requested to the maximum shareable number of the shareable device multiplied by the resource property value.

Alternatively, the shareable device satisfies conditions that the shareable device includes allocated shareable resources, the number of shareable resources requested is less than or equal to a difference between the maximum shareable number of the shareable device and the number of the allocated shareable resources, and an amount of resource properties satisfies an expression in resource property requirements.

The second device includes a shareable device.

The shareable device satisfies conditions that the shareable device does not include allocated shareable resources and the number of shareable resources requested is less than or equal to the maximum shareable number of the shareable device.

Alternatively, the shareable device satisfies conditions that the shareable device does not include allocated shareable resources, the number of shareable resources requested is less than or equal to the maximum shareable number of the shareable device, and an amount of resource properties requested is less than or equal to a product of a ratio of the number of shareable resources requested to the maximum shareable number of the shareable device multiplied by the resource property value.

Alternatively, a shareable device satisfies conditions that the shareable device does not include allocated shareable resources, the number of shareable resources requested is less than or equal to the maximum shareable number of the shareable device, and an amount of resource properties satisfies an expression in resource property requirements.

When each type of shareable resources of each container is allocated to the Pod object, either the same type of shareable resources allocated to the same container belongs to the same shareable device, or multiple shareable devices are allocated to the same type of shareable resources of the same container and a shareable device which has allocated shareable resources is preferentially allocated.

In some other embodiments of the present disclosure, the method further includes the followings.

The Pod object, the selected node and the allocated resources are bound, and the Pod object bound to the selected node and the allocated resources is stored. The allocated resources include: shareable resources, or shareable resources and non-shareable resources.

In some exemplary implementations, the fourth module binds the Pod object, the selected node and the allocated resources, returns the Pod object bound to the selected node and the allocated resources to the third module, and the third module stores the Pod object bound to the selected node and the allocated resources.

In the embodiments of the present disclosure, the operation of binding the Pod object, the selected node and the allocated resources refers to storing information of the selected node and information of the allocated resources in the Pod object.

In some other embodiments of the present disclosure, the method further includes the followings.

The management node receives the shareable resource information of the shareable device reported by the slave node, and stores or updates the shareable resource information of the shareable device.

In some exemplary implementations, the third module receives the shareable resource information of the shareable device reported by the second module, and stores or updates the shareable resource information of the shareable device.

In the embodiments of the present disclosure, the shareable resource information includes: an ID of the shareable device, resource property information of the shareable device and a maximum shareable number of the shareable device.

The resource scheduling methods according to the embodiments of the present disclosure achieve the following beneficial effects.

1. A mechanism for managing and scheduling shared devices/resources is introduced into Kubernetes, which provides a good extension mechanism, facilitates the introduction of other shared devices (such as FPGA and TPU), and can increase the utilization of a device by multiple times; and 2. Hybrid scheduling of an exclusive mode and a sharing mode of a shareable device in Kubernetes is supported, thereby improving the ease of use for users and reducing operation and maintenance costs.

Embodiments

This embodiment describes a method for hybrid scheduling of a GPU device in a hybrid mode on a Kubernetes platform.

Taking a GPU being an external resource as an example, the sharing and exclusive allocation and scheduling issues of a GPU device are solved by a Kubernetes cluster extended by the embodiments of the present disclosure. A Kubernetes cluster simultaneously receives a training job and an inference job (i.e., the described Pod object), adaptively allocates GPU resources according to a job request, and schedules different jobs for a GPU in an exclusive mode and a sharing mode respectively.

Exemplary environment: a Kubernetes cluster carrying a Ubuntu 16.04 system, including one management node and one slave node; and each node contains four GTX 1080Ti GPUs, CUDA driver version 9.0, and nvidia-docker is installed thereon.

The specific operations are as follows.

In operation 1, a Kubernetes scheduler, Kubelet, Device-plugin which have been developed and modified by the present disclosure are deployed (the maximum shareable number of a device configured with shared GPU devices is 8).

Figure 4:
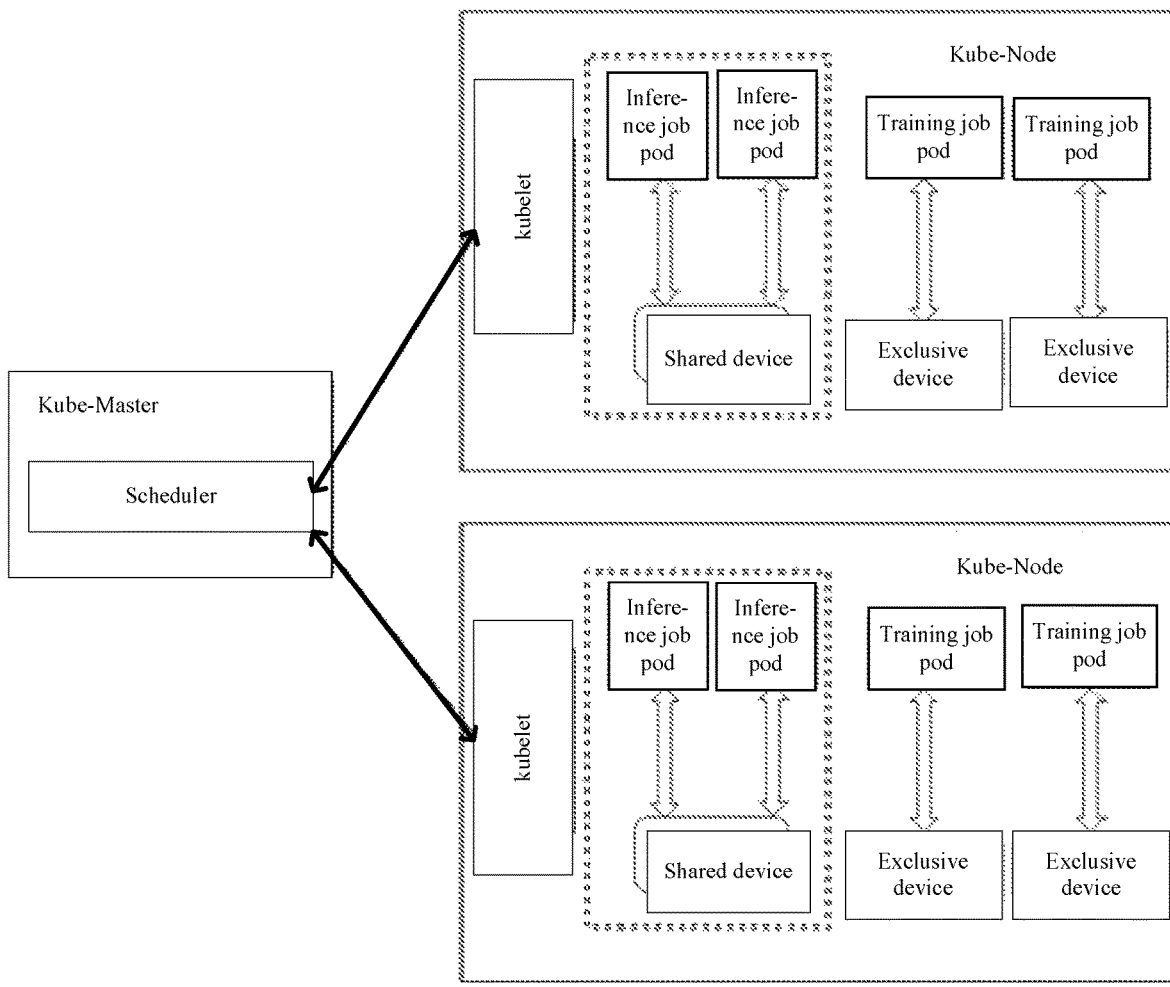
FIG. 4 is a schematic diagram of coexistence of a sharing mode and an exclusive mode of resources of a device in examples of embodiments of the present disclosure.

In operation 2, after the deployment of the cluster is completed, as shown in FIG. 4, a training job is applied for creating, and yaml description is as follows:

```
# applying for two independent GPUs
apiVersion: v1
kind: Pod
metadata:
    name: train-demo
spec:
container:
    - name: gpu-container-1
      image: ai.zte.io/train:2.0
      resources:
        limits:
          alpha.kubernetes.io/zte-gpu: 2
```

In operation 3, after a Pod is successfully created, the usage condition of the GPUs is checked via a nvidia-smi command on the nodes, and if it is found that a process is executed on two GPUs, it is indicated that GPUs in an exclusive mode are successfully allocated.

In operation 4, an inference job is applied for creating, and yaml description is as follows:

```
# applying for 2 slices of GPUs
apiVersion: v1
kind: Pod
metadata:
    name: inference-demo
spec:
container:
    - name: gpu-container-1
      image: ai.zte.io/inference:2.0
      resources:
        limits:
          alpha.kubernetes.io/zte-gpu: 2slice
```

In operation 5, after the Pod is successfully created, first the running situation of the Pod is checked via a kubectl get pods command, to confirm that an MPS Server Pod has been created. Then, upon checking, an inference job pod is created successfully, and the following usage conditions of GPU processes are checked via a nvidia-smi command: 1) two GPUs run in an exclusive mode, and an execution process number thereof is a training job pod inner-process; and 2) one GPU runs in a sharing mode, and an execution process number thereof is nvidia-cuda-mps-server, and meanwhile the display memory occupancy rate of the GPU is observed to be about ¼.

This architecture solution can increase the utilization of a GPU device to the greatest extent while satisfying multiple job types. Furthermore, the proportion of the exclusive mode and the proportion of the sharing mode can be adaptively adjusted according to the service condition of the system, for example, when the amount of services requiring shared resources is relatively large, the proportion of the GPU sharing mode is dynamically increased, thereby further increasing the utilization of the GPU device.

Some other embodiments of the present disclosure provide a resource scheduling apparatus, including a processor and a computer-readable storage medium, wherein the computer-readable storage medium has instructions stored therein, and when the instructions are executed by the processor, any one of the described resource scheduling methods is implemented.

Some other embodiments of the present disclosure provide a computer-readable storage medium which has computer programs stored therein, wherein when the computer programs are executed by a processor, operations of any one of the described resource scheduling methods are implemented.

Figure 5:
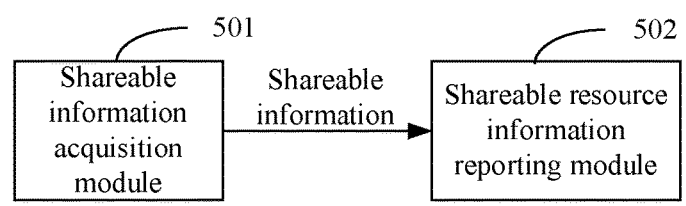
FIG. 5 is a schematic structural diagram of composition of a resource scheduling apparatus provided in some other embodiments of the present disclosure.

Referring to FIG. 5, some other embodiments of the present disclosure provide a resource scheduling apparatus, including a shareable information acquisition module 501 (such as the described Device plugin) and a shareable resource information reporting module 502 (such as the described kubelet).

The shareable information acquisition module 501 (such as the described Device plugin) is configured to acquire shareable information of each shareable device, wherein the shareable information includes: an ID of the shareable device, a maximum shareable number of the shareable device, and a device state and resource property information of the shareable device; and the device state includes: whether the shareable device is healthy and whether the shareable device is available.

The shareable resource information reporting module 502 (such as the described kubelet) is configured to convert the shareable information into shareable resource information, and report the shareable resource information to a management node, wherein the shareable resource information of the device includes: the ID of the shareable device, the resource property information of the shareable device and the maximum shareable number of the shareable device.

In some other embodiments of the present disclosure, the shareable resource information reporting module 502 is further configured to:

periodically acquire, from the management node, a Pod object which is bound to a slave node but is not started, and create a Pod according to allocated resources bound to the Pod object.

The specific implementation process of the slave node in the embodiments of the present disclosure is the same as the specific implementation process of the resource scheduling method applied to a slave node in the described embodiments, and will not be repeated herein.

Figure 6:
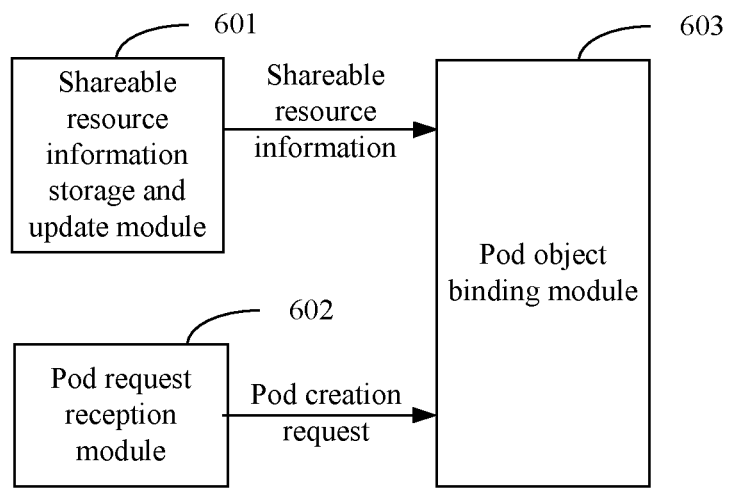
FIG. 6 is a schematic structural diagram of composition of a resource scheduling apparatus provided in some other embodiments of the present disclosure.

Referring to FIG. 6, some other embodiments of the present disclosure provide a resource scheduling apparatus, including: a Pod object creation module 602 (such as the described API Server) and a Pod object binding module 603 (such as the described Scheduler).

The Pod object creation module 602 (such as the described API Server) is configured to receive a Pod creation request from a user, wherein the Pod creation request includes: requirements of each container for each type of shareable resources.

The Pod object binding module 603 (such as the described Scheduler) is configured to select a node for a Pod object to be created, and allocate each type of shareable resources of each container to the Pod object according to shareable resource information of a shareable device in the selected node.

In some other embodiments of the present disclosure, the Pod object binding module 603 is further configured to: bind the Pod object, the selected node and allocated resources, and store the Pod object bound to the selected node and the allocated resources.

In some other embodiments of the present disclosure, the apparatus further includes a shareable resource information storage and update module 601 (such as the described API Server).

The shareable resource information storage and update module 601 (such as the described API Server) is configured to receive shareable resource information of a shareable device reported by a slave node, and store or update the shareable resource information of the shareable device, wherein the shareable resource information includes: an ID of the shareable device, resource property information of the shareable device and a maximum shareable number of the shareable device.

The requirements for each type of shareable resources include: the number of shareable resources; or the number of shareable resources and resource property requirements corresponding to the shareable resources. The resource property requirements include: a resource property value requested or an expression that the resource property value satisfies.

In the embodiments of the present disclosure, the Pod object binding module 603 is configured to allocate each type of shareable resources of each container to the Pod object according to shareable resource information of a shareable device in the selected node by using any one or more of the following modes:

for each type of shareable resources of each container, in a case where the selected node has a shareable device including allocated shareable resources, shareable resources in a first device are allocated to the Pod object; and for each type of shareable resources of each container, in a case where none of shareable devices in the selected node includes allocated shareable resources, shareable resources in a second device are allocated to the Pod object.

The first device includes a shareable device.

The shareable device satisfies conditions that the shareable device includes allocated shareable resources and the number of shareable resources requested is less than or equal to a difference between the maximum shareable number of the shareable device and the number of the allocated shareable resources.

Alternatively, the shareable device satisfies conditions that the shareable device includes allocated shareable resources, the number of shareable resources requested is less than or equal to a difference between the maximum shareable number of the shareable device and the number of the allocated shareable resources, and an amount of resource properties requested is less than or equal to a product of a ratio of the number of shareable resources requested to the maximum shareable number of the shareable device multiplied by the resource property value.

Alternatively, the shareable device satisfies conditions that the shareable device includes allocated shareable resources, the number of shareable resources requested is less than or equal to a difference between the maximum shareable number of the shareable device and the number of the allocated shareable resources, and an amount of resource properties satisfies an expression in resource property requirements.

The second device includes a shareable device.

The shareable device satisfies conditions that the shareable device does not include allocated shareable resources and the number of shareable resources requested is less than or equal to the maximum shareable number of the shareable device.

Alternatively, the shareable device satisfies conditions that the shareable device does not include allocated shareable resources, the number of shareable resources requested is less than or equal to the maximum shareable number of the shareable device, and an amount of resource properties requested is less than or equal to a product of a ratio of the number of shareable resources requested to the maximum shareable number of the shareable device multiplied by the resource property value.

Alternatively, the shareable device satisfies conditions that the shareable device does not include allocated shareable resources, the number of shareable resources requested is less than or equal to the maximum shareable number of the shareable device, and an amount of resource properties satisfies an expression in resource property requirements.

The specific implementation process of a management node in the embodiments of the present disclosure is the same as the specific implementation process of the resource scheduling method applied to a management node in the described embodiments, and will not be repeated herein.

Figure 7:
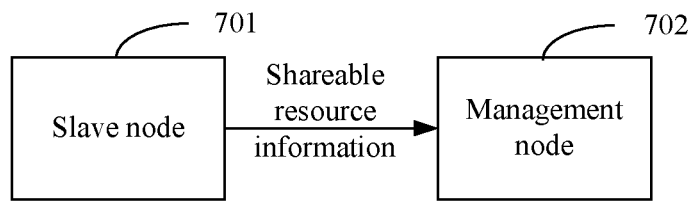
FIG. 7 is a schematic structural diagram of composition of a resource scheduling system provided in some other embodiments of the present disclosure.

Referring to FIG. 7, some other embodiments of the present disclosure provide a resource scheduling system, including: a slave node 701 and a management node 702.

The slave node 701 is configured to acquire shareable information of each shareable device, wherein the shareable information includes: an ID of the shareable device, a maximum shareable number of the shareable device, and a device state and resource property information of the shareable device; and the device state includes: whether the shareable device is healthy and whether the shareable device is available; and configured to convert the shareable information into shareable resource information, and report the shareable resource information to a management node, wherein the shareable resource information includes: the ID of the shareable device, the resource property information of the shareable device and the maximum shareable number of the shareable device.

The management node 702 is configured to receive the shareable resource information of the shareable device reported by the slave node, and store or update the shareable resource information of the shareable device, wherein the shareable resource information includes: an ID of the shareable device, resource property information of the shareable device and a maximum shareable number of the shareable device; configured to receive a Pod creation request from a user, wherein the Pod creation request includes: requirements of each container for each type of shareable resources; and configured to select a node for a Pod object to be created, and allocate each type of shareable resources of each container to the Pod object according to shareable resource information of a shareable device in the selected node.

Specific implementations of the described slave node 701 and management node 702 are the same as the specific implementation processes in the described embodiments, and are not repeated herein.

A person having ordinary skill in the art would appreciate that the functional modules/units in all or some of the operations, systems and apparatuses of the methods disclosed above can be implemented as software, firmware, hardware, and any suitable combination thereof. In a hardware embodiment, the division of functional modules/units mentioned in the description above does not necessarily correspond to the division of physical components; for example, one physical component may have multiple functions, or one function or operation may be performed cooperatively by several physical components. Some or all of the components may be implemented as software executed by a processor, such as a digital signal processor or a microprocessor, or implemented as hardware, or implemented as an integrated circuit, such as an application-specific integrated circuit. Such software may be distributed on a computer-readable medium which may include a computer storage medium (or non-transitory medium) and a communication medium (or transitory medium). As is well known to a person having ordinary skill in the art, the term "computer storage medium" includes transitory and non-transitory, removable and non-removable medium implemented in any method or technology for storing information (such as computer-readable instructions, data structures, program modules, or other data). The computer storage medium includes but is not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage apparatuses, or any other medium which can be used to store desired information and can be accessed by a computer. In addition, as is well known to a person having ordinary skill in the art, the communication medium typically includes computer-readable instructions, data structures, program modules, or other data in a modulated data signal such as a carrier or other transmission mechanisms, and may include any information delivery medium.

Although the embodiments of the present disclosure are described above, the described content merely relates to embodiments used for facilitating understanding of the embodiments of the present disclosure, and are not intended to limit the embodiments of the present disclosure. A person skilled in the field to which the embodiments of the present disclosure belong can make various modifications and variations to the implementation forms and details without departing from the spirit and scope disclosed in the embodiments of the present disclosure. However, the scope of patent protection of the embodiments of the present disclosure is still subject to the scope defined by the appended claims.

What is claimed is:

1. A resource scheduling method, comprising:
receiving, by a management node, a Pod creation request from a user, wherein the Pod creation request comprises: requirements of each container for each type of shareable resources; and
selecting, by the management node, a node for a Pod object to be created, and allocating each type of shareable resources of each container to the Pod object according to shareable resource information of a shareable device in the selected node, wherein the shareable resource information comprises: an identifier (ID) of the shareable device, resource property information of the shareable device and a maximum shareable number of the shareable device;
wherein in a case where a unit is not specified for the number of each type of shareable resources requested in the Pod creation request, the unit of the shareable resource requested is device by default and the device is processed according to an exclusive mode, and the unit of the number of each type of shareable resources requested is converted into slice;
in a case where a unit is specified for the number of each type of shareable resources requested in the Pod creation request, the device is processed according to a sharing mode, and the number of each type of shareable resources requested is required to be less than or equal to the maximum shareable number of the shareable device.

2. The method according to claim 1, further comprising:
receiving, by the management node, shareable resource information of a shareable device reported by a slave node, and storing or updating the shareable resource information of the shareable device.

3. The method according to claim 1, wherein the requirements for each type of shareable resources comprise: the number of shareable resources requested; or the number of shareable resources requested and resource property requirements corresponding to the shareable resources, wherein the resource property requirements comprise: a resource property value requested or an expression that the resource property value satisfies.

4. The method according to claim 3, wherein allocating each type of shareable resources of each container to the Pod object according to shareable resource information of a shareable device in the selected node comprises any one or more of the following:
for each type of shareable resources of each container, in a case where the selected node has a shareable device comprising allocated shareable resources, allocating shareable resources in a first device to the Pod object; and
for each type of shareable resources of each container, in a case where none of shareable devices in the selected node comprises allocated shareable resources, allocating shareable resources in a second device to the Pod object;
wherein the first device comprises:
a shareable device satisfying conditions that the shareable device comprises allocated shareable resources and the number of shareable resources requested is less than or equal to a difference between the maximum shareable number of the shareable device and the number of the allocated shareable resources;
or a shareable device satisfying conditions that the shareable device comprises allocated shareable resources, the number of shareable resources requested is less than or equal to a difference between the maximum shareable number of the shareable device and the number of the allocated shareable resources, and an amount of resource properties requested is less than or equal to a product of a ratio of the number of shareable resources requested to the maximum shareable number of the shareable device multiplied by the resource property value;
or a shareable device satisfying conditions that the shareable device comprises allocated shareable resources, the number of shareable resources requested is less than or equal to a difference between the maximum shareable number of the shareable device and the number of the allocated shareable resources, and an amount of resource properties satisfies the expression in the resource property requirements; and
the second device comprises:
a shareable device satisfying conditions that the shareable device does not comprise allocated shareable resources and the number of shareable resources requested is less than or equal to the maximum shareable number of the shareable device;
or a shareable device satisfying conditions that the shareable device does not comprise allocated shareable resources, the number of shareable resources requested is less than or equal to the maximum shareable number of the shareable device, and an amount of resource properties requested is less than or equal to a product of a ratio of the number of shareable resources requested to the maximum shareable number of the shareable device multiplied by the resource property value;

or a shareable device satisfying conditions that the shareable device does not comprise allocated shareable resources, the number of shareable resources requested is less than or equal to the maximum shareable number of the shareable device, and an amount of resource properties satisfies the expression in the resource property requirements.

5. The method according to claim 1, further comprising:
acquiring, by a slave node, shareable information of each shareable device, wherein the shareable information comprises: an identifier (ID) of the shareable device, a maximum shareable number of the shareable device, and a device state and resource property information of the shareable device; and the device state comprises: whether the shareable device is healthy and whether the shareable device is available; and converting, by the slave node, the shareable information into shareable resource information, and reporting the shareable resource information to a management node, wherein the shareable resource information comprises: the ID of the shareable device, the resource property information of the shareable device and the maximum shareable number of the shareable device.

6. A resource scheduling apparatus, comprising a processor and a computer-readable storage medium, wherein the computer-readable storage medium has instructions stored therein, and when the instructions are executed by the processor, the operations in the method according to claim 5 are implemented.

7. A non-transitory computer-readable storage medium, on which computer programs are stored, wherein when the computer programs are executed by a processor, the operations in the method according to claim 5 are implemented.

8. The method according to claim 5, further comprising:
acquiring, from the management node by the slave node, a Pod object which is bound to the slave node but is not started, and creating, by the slave node, a Pod according to allocated resources bound to the Pod object.

9. The method according to claim 8, wherein creating, by the slave node, a Pod according to allocated resources bound to the Pod object comprises:
according to the allocated resources bound to the Pod object, triggering loading of a device and acquiring configuration information, and creating the Pod according to the configuration information and information of the allocated resources.

10. The method according to claim 9, wherein the allocated resources include shareable resources, or shareable resources and non-shareable resources.

11. A resource scheduling apparatus, comprising a processor and a computer-readable storage medium, wherein the computer-readable storage medium has instructions stored therein, and when the instructions are executed by the processor, the operations in the method according to claim 1 are implemented.

12. A non-transitory computer-readable storage medium, on which computer programs are stored, wherein when the computer programs are executed by a processor, the operations in the method according to claim 1 are implemented.

13. The method according to claim 1, wherein the maximum shareable number of the shareable device refers to the number of all sub-resources obtained by segmenting the shareable device as a shareable resource.

14. The method according to claim 1, wherein the Pod creation request further comprises: image information of containers, and basic information of the Pod.

15. The method according to claim 1, wherein
the exclusive mode means that one device is exclusively used by one container; and
the sharing mode means that one device is used concurrently by multiple containers.

16. The method according to claim 1, wherein selecting, by the management node, a node for a Pod object to be created comprises:
selecting, for the Pod object to be created, that node that has a device that satisfies the requirements of the requested shareable resources for each type of shareable resources requested.

17. The method according to claim 1, further comprising:
binding the Pod object, the selected node and the allocated resources, and storing the Pod object bound to the selected node and the allocated resources.

18. The method according to claim 17, wherein binding the Pod object, the selected node and the allocated resources comprises:
storing information of the selected node and information of the allocated resources in the Pod object.

19. A resource scheduling system, comprising:
a slave node, configured to acquire shareable information of each shareable device, wherein the shareable information comprises: an identifier (ID) of the shareable device, a maximum shareable number of the shareable device, and a device state and resource property information of the shareable device; and the device state comprises: whether the shareable device is healthy and whether the shareable device is available; and configured to convert the shareable information into shareable resource information, and report the shareable resource information to a management node, wherein the shareable resource information comprises: the ID of the shareable device, the resource property information of the shareable device and the maximum shareable number of the shareable device; and the management node, configured to receive the shareable resource information of the shareable device reported by the slave node, and store or update the shareable resource information of the shareable device, wherein the shareable resource information comprises: the ID of the shareable device, the resource property information of the shareable device and the maximum shareable number of the shareable device; configured to receive a Pod creation request from a user, wherein the Pod creation request comprises the following description information: requirements of each container for each type of shareable resources; and configured to select a node for a Pod object to be created, and allocate each type of shareable resources of each container to the Pod object according to the shareable resource information of the shareable device in the selected node;

wherein in a case where a unit is not specified for the number of each type of shareable resources requested in the Pod creation request, the unit of the shareable resource requested is device by default and the device is processed according to an exclusive mode, and the unit of the number of each type of shareable resources requested is converted into slice;

in a case where a unit is specified for the number of each type of shareable resources requested in the Pod creation request, the device is processed according to a sharing mode, and the number of each type of shareable resources requested is required to be less than or equal to the maximum shareable number of the shareable device.

* * * * *